US012676058B2

(12) United States Patent
Drako et al.

(10) Patent No.: US 12,676,058 B2
(45) Date of Patent: Jul. 7, 2026

(54) REAL TIME CAMERA MAP FOR EMERGENCY VIDEO STREAM REQUISITION SERVICE

(71) Applicant: EAGLE EYE NETWORKS, INC., Austin, TX (US)

(72) Inventors: Dean Drako, Austin, TX (US); Tijmen Vos, Amsterdam (NL)

(73) Assignee: Brivo, Inc, Austin, TX (US)

( * ) Notice: Subject to any disclaimer, the term of this patent is extended or adjusted under 35 U.S.C. 154(b) by 190 days.

(21) Appl. No.: 17/952,548

(22) Filed: Sep. 26, 2022

(65) Prior Publication Data

US 2023/0079451 A1      Mar. 16, 2023

Related U.S. Application Data

(60) Continuation-in-part of application No. 17/563,044, filed on Dec. 28, 2021, now abandoned, which is a division of application No. 17/241,066, filed on Apr. 27, 2021, now abandoned, which is a continuation-in-part of application No. 16/863,677, filed on Apr. 30, 2020, now Pat. No. 11,115,627.

(51) Int. Cl.
| | |
|---|---|
| *G08B 13/196* | (2006.01) |
| *G08B 25/00* | (2006.01) |
| *H04N 7/18* | (2006.01) |
| *H04W 4/029* | (2018.01) |
| *H04W 12/02* | (2009.01) |
| *H04W 12/06* | (2021.01) |
| *H04W 12/08* | (2021.01) |

(52) U.S. Cl.
CPC ... *G08B 13/1966* (2013.01); *G08B 13/19645* (2013.01); *G08B 13/19667* (2013.01); *G08B 13/19673* (2013.01); *G08B 13/19686* (2013.01); *G08B 25/006* (2013.01); *H04W 4/029* (2018.02); *H04W 12/08* (2013.01)

(58) Field of Classification Search
None
See application file for complete search history.

(56) References Cited

U.S. PATENT DOCUMENTS

| | | | | |
|---|---|---|---|---|
| 6,208,379 B1 * | 3/2001 | Oya | | H04N 23/635 |
| | | | | 348/E7.086 |
| 7,116,357 B1 * | 10/2006 | Oya | | G08B 13/1968 |
| | | | | 348/E7.086 |

(Continued)

*Primary Examiner* — Hung Q Dang

(57) ABSTRACT

A system provides a transformed video stream from, a publicly or privately owned and operated camera bearing on an in-scope location vicinity, to, a responding emergency service agency (ESA). A request from an emergency services agent's display terminal includes location indicia and elicits a map of cameras bearing on the location vicinity as well as other display terminals in the area. Upon request, an application programming interface enables a video stream to comply with the privacy and access settings of the camera owner/operators. A plurality of private and public security surveillance cameras is coupled to a server. Exterior/street view video images are streamed to the server which may contact an owner for emergency access. An emergency agency vehicle at a location has a display for a selected gallery of obfuscated exterior/street views from cooperative networks of public and private security cameras bearing on the vicinity of an incident.

10 Claims, 8 Drawing Sheets

(56)     References Cited

U.S. PATENT DOCUMENTS

| | | | |
|---|---|---|---|
| 10,499,016 B1* | 12/2019 | Zacarese | G06T 11/206 |
| 2007/0200914 A1* | 8/2007 | DuMas | G08B 13/19645 |
| | | | 348/E7.086 |
| 2012/0262576 A1* | 10/2012 | Sechrist | H04N 21/21805 |
| | | | 348/E5.031 |
| 2012/0281095 A1* | 11/2012 | Trenciansky | H04N 7/18 |
| | | | 348/143 |
| 2015/0172894 A1* | 6/2015 | Gabel | H04W 4/029 |
| | | | 455/404.2 |
| 2018/0151039 A1* | 5/2018 | Lemberger | H04L 12/4625 |
| 2019/0327450 A1* | 10/2019 | Malik | H04W 4/025 |
| 2020/0042945 A1* | 2/2020 | Schuler | G06Q 50/26 |
| 2021/0233371 A1* | 7/2021 | Brake | H04N 7/18 |

* cited by examiner

Figure 2:
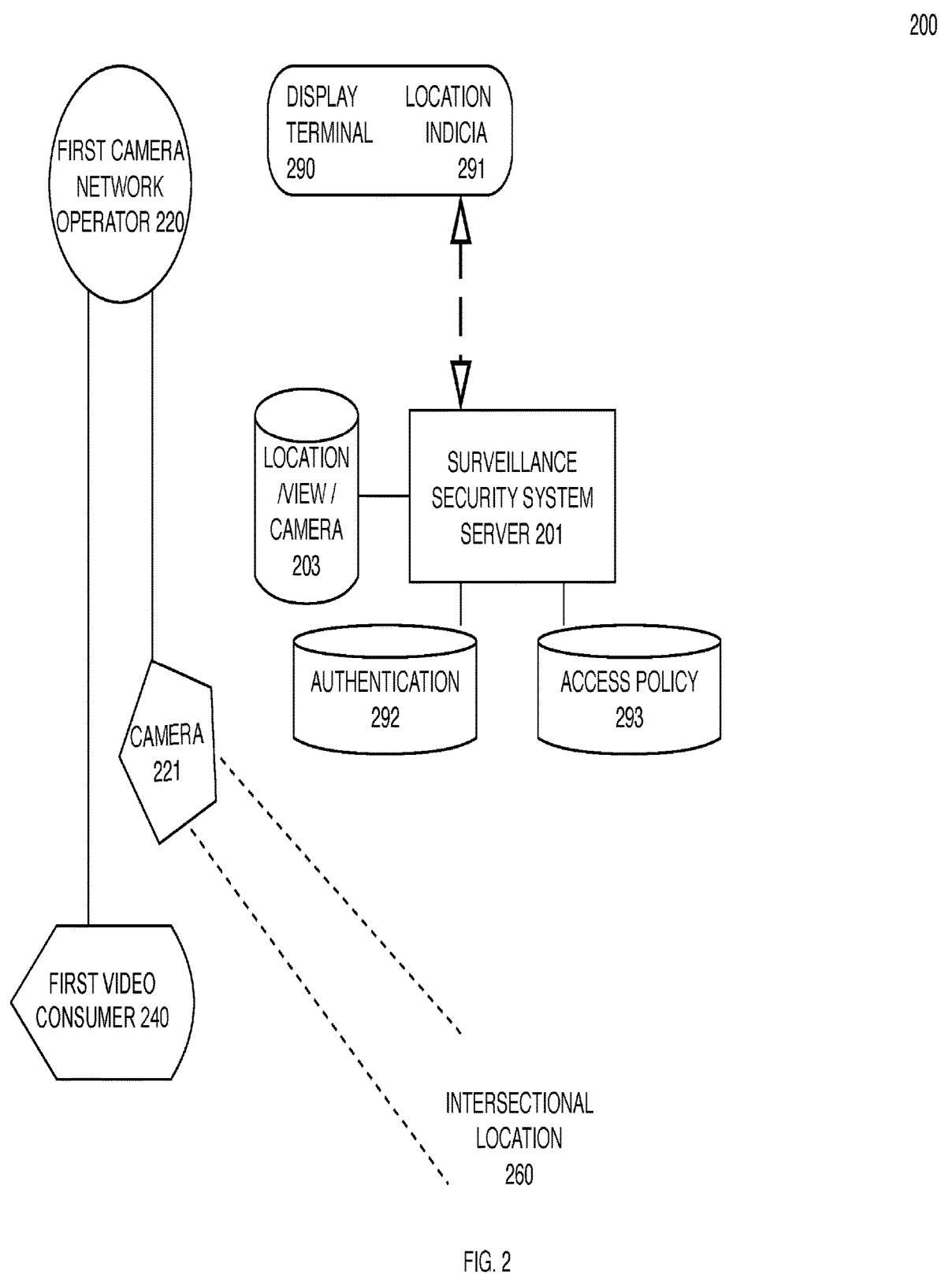

200

FIRST CAMERA
NETWORK
OPERATOR 220

DISPLAY      LOCATION
TERMINAL     INDICIA
290              291

LOCATION
/VIEW /
CAMERA
203

SURVEILLANCE
SECURITY SYSTEM
SERVER 201

CAMERA
221

AUTHENTICATION
292

ACCESS POLICY
293

FIRST VIDEO
CONSUMER 240

INTERSECTIONAL
LOCATION
260

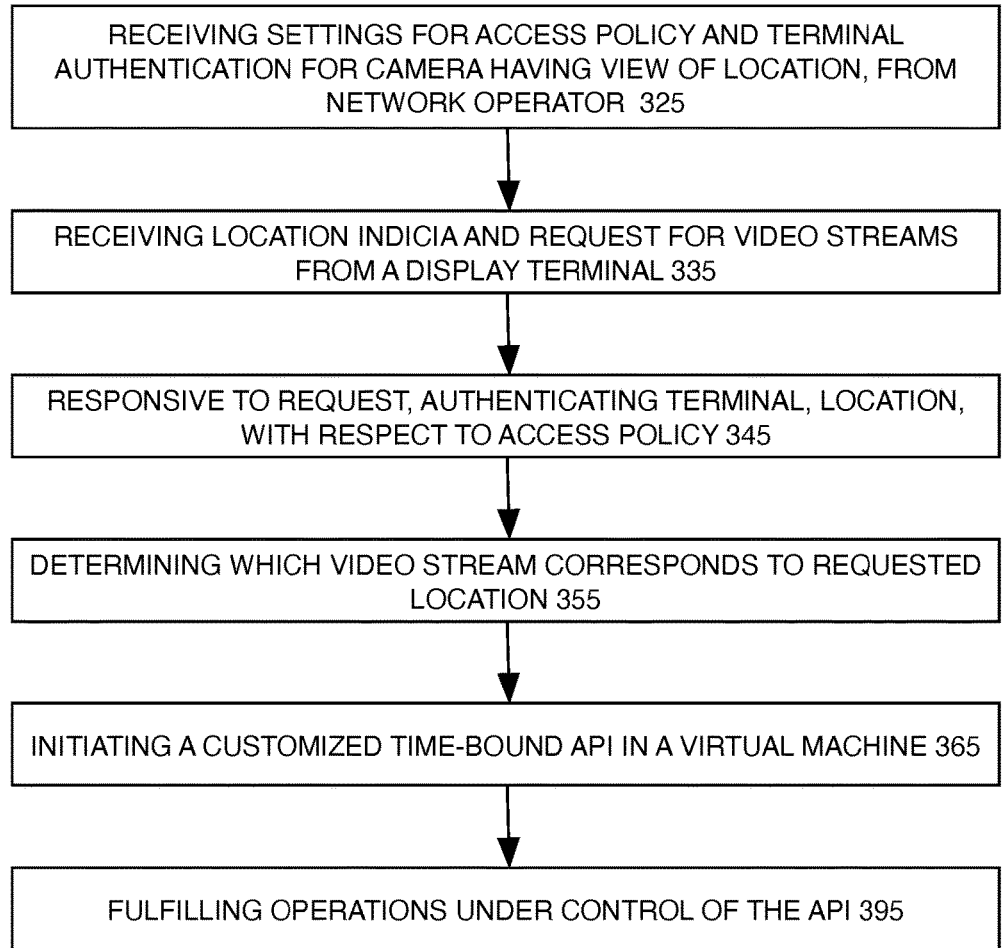

RECEIVING SETTINGS FOR ACCESS POLICY AND TERMINAL AUTHENTICATION FOR CAMERA HAVING VIEW OF LOCATION, FROM NETWORK OPERATOR  325

RECEIVING LOCATION INDICIA AND REQUEST FOR VIDEO STREAMS FROM A DISPLAY TERMINAL 335

RESPONSIVE TO REQUEST, AUTHENTICATING TERMINAL, LOCATION, WITH RESPECT TO ACCESS POLICY 345

DETERMINING WHICH VIDEO STREAM CORRESPONDS TO REQUESTED LOCATION 355

INITIATING A CUSTOMIZED TIME-BOUND API IN A VIRTUAL MACHINE 365

FULFILLING OPERATIONS UNDER CONTROL OF THE API 395

FIG 3

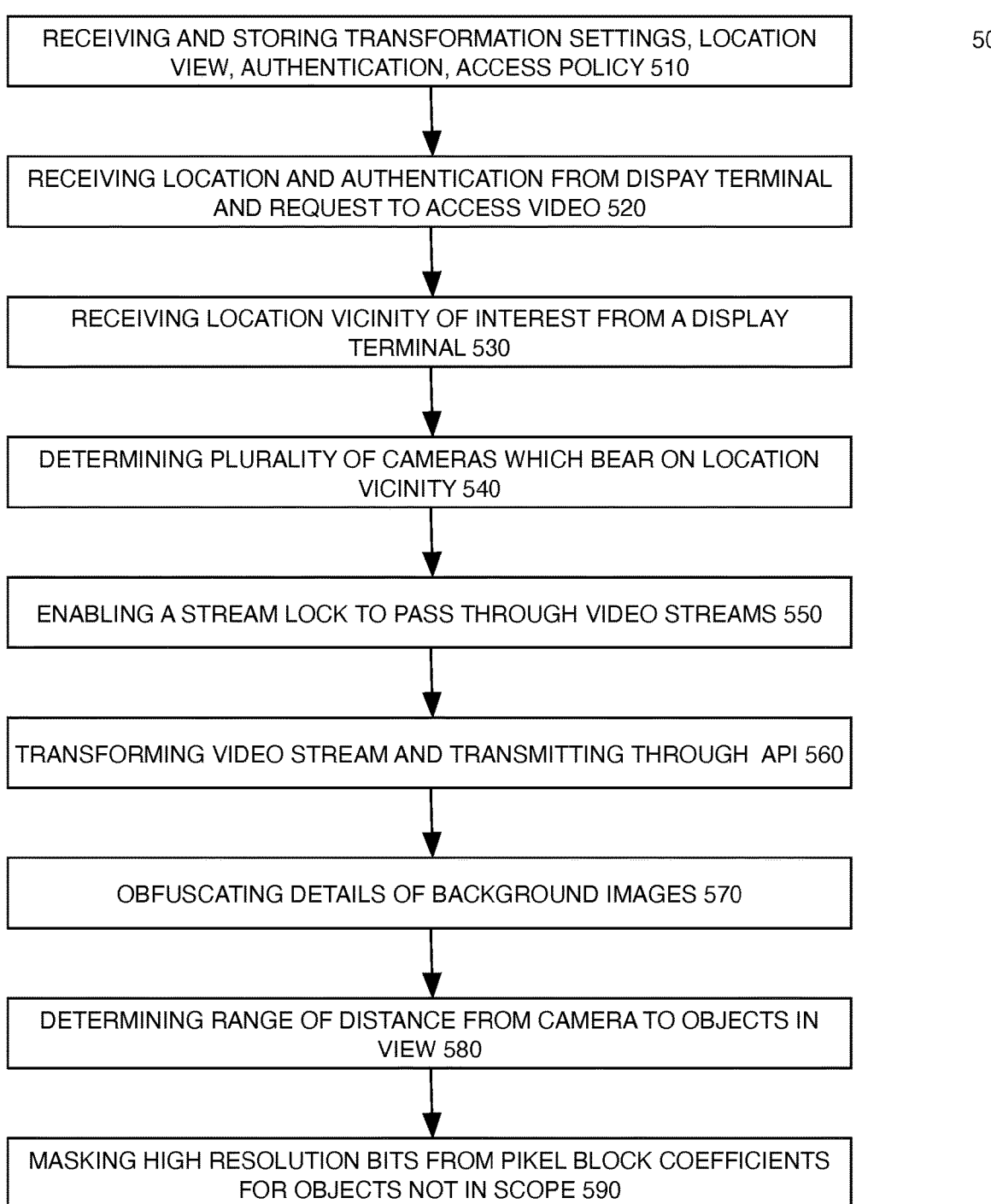

500

RECEIVING AND STORING TRANSFORMATION SETTINGS, LOCATION VIEW, AUTHENTICATION, ACCESS POLICY 510

RECEIVING LOCATION AND AUTHENTICATION FROM DISPAY TERMINAL AND REQUEST TO ACCESS VIDEO 520

RECEIVING LOCATION VICINITY OF INTEREST FROM A DISPLAY TERMINAL 530

DETERMINING PLURALITY OF CAMERAS WHICH BEAR ON LOCATION VICINITY 540

ENABLING A STREAM LOCK TO PASS THROUGH VIDEO STREAMS 550

TRANSFORMING VIDEO STREAM AND TRANSMITTING THROUGH API 560

OBFUSCATING DETAILS OF BACKGROUND IMAGES 570

DETERMINING RANGE OF DISTANCE FROM CAMERA TO OBJECTS IN VIEW 580

MASKING HIGH RESOLUTION BITS FROM PIKEL BLOCK COEFFICIENTS FOR OBJECTS NOT IN SCOPE 590

FIG 5

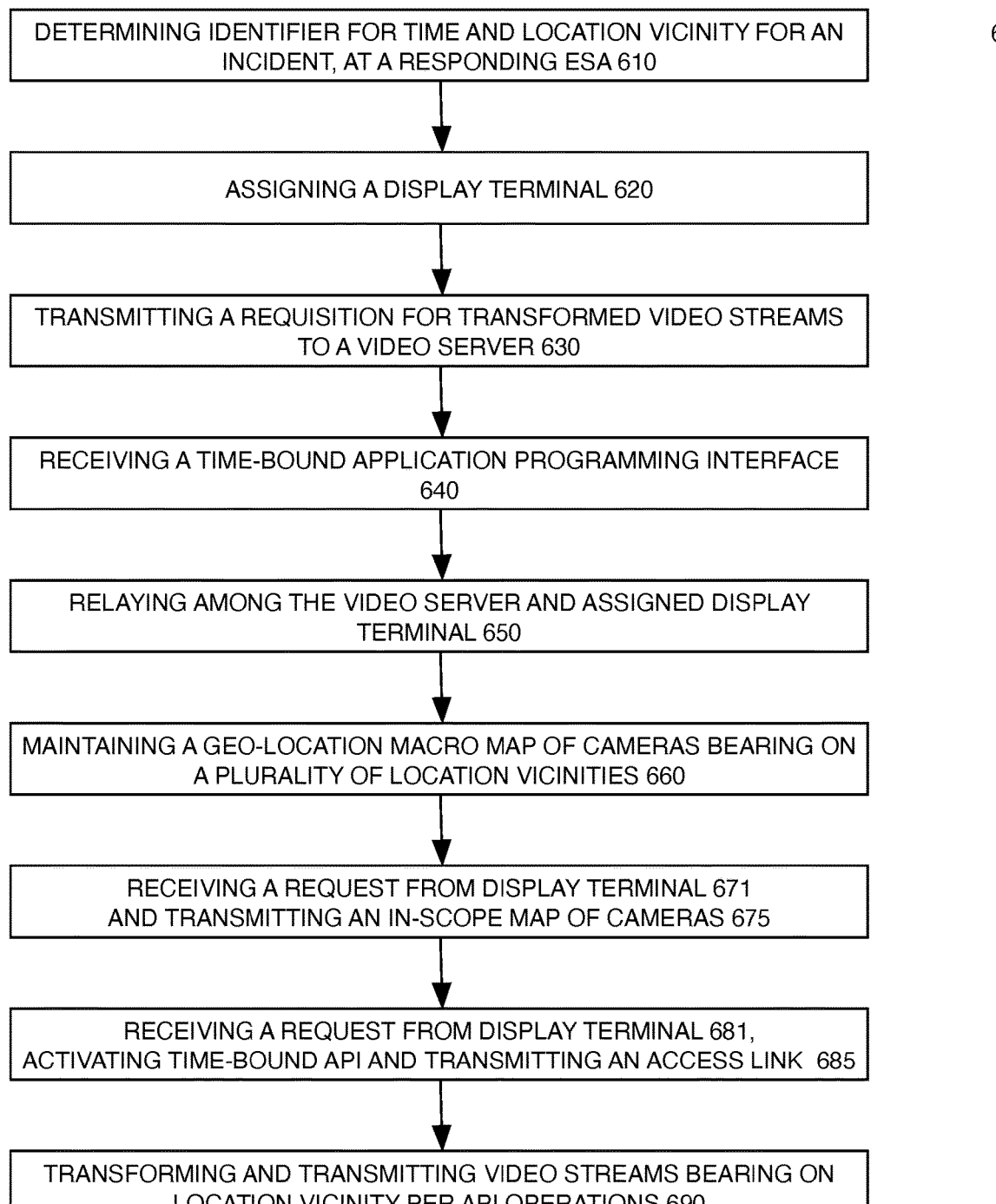

600

DETERMINING IDENTIFIER FOR TIME AND LOCATION VICINITY FOR AN
INCIDENT, AT A RESPONDING ESA 610

ASSIGNING A DISPLAY TERMINAL 620

TRANSMITTING A REQUISITION FOR TRANSFORMED VIDEO STREAMS
TO A VIDEO SERVER 630

RECEIVING A TIME-BOUND APPLICATION PROGRAMMING INTERFACE
640

RELAYING AMONG THE VIDEO SERVER AND ASSIGNED DISPLAY
TERMINAL 650

MAINTAINING A GEO-LOCATION MACRO MAP OF CAMERAS BEARING ON
A PLURALITY OF LOCATION VICINITIES 660

RECEIVING A REQUEST FROM DISPLAY TERMINAL 671
AND TRANSMITTING AN IN-SCOPE MAP OF CAMERAS 675

RECEIVING A REQUEST FROM DISPLAY TERMINAL 681,
ACTIVATING TIME-BOUND API AND TRANSMITTING AN ACCESS LINK 685

TRANSFORMING AND TRANSMITTING VIDEO STREAMS BEARING ON
LOCATION VICINITY PER API OPERATIONS 690

FIG 6

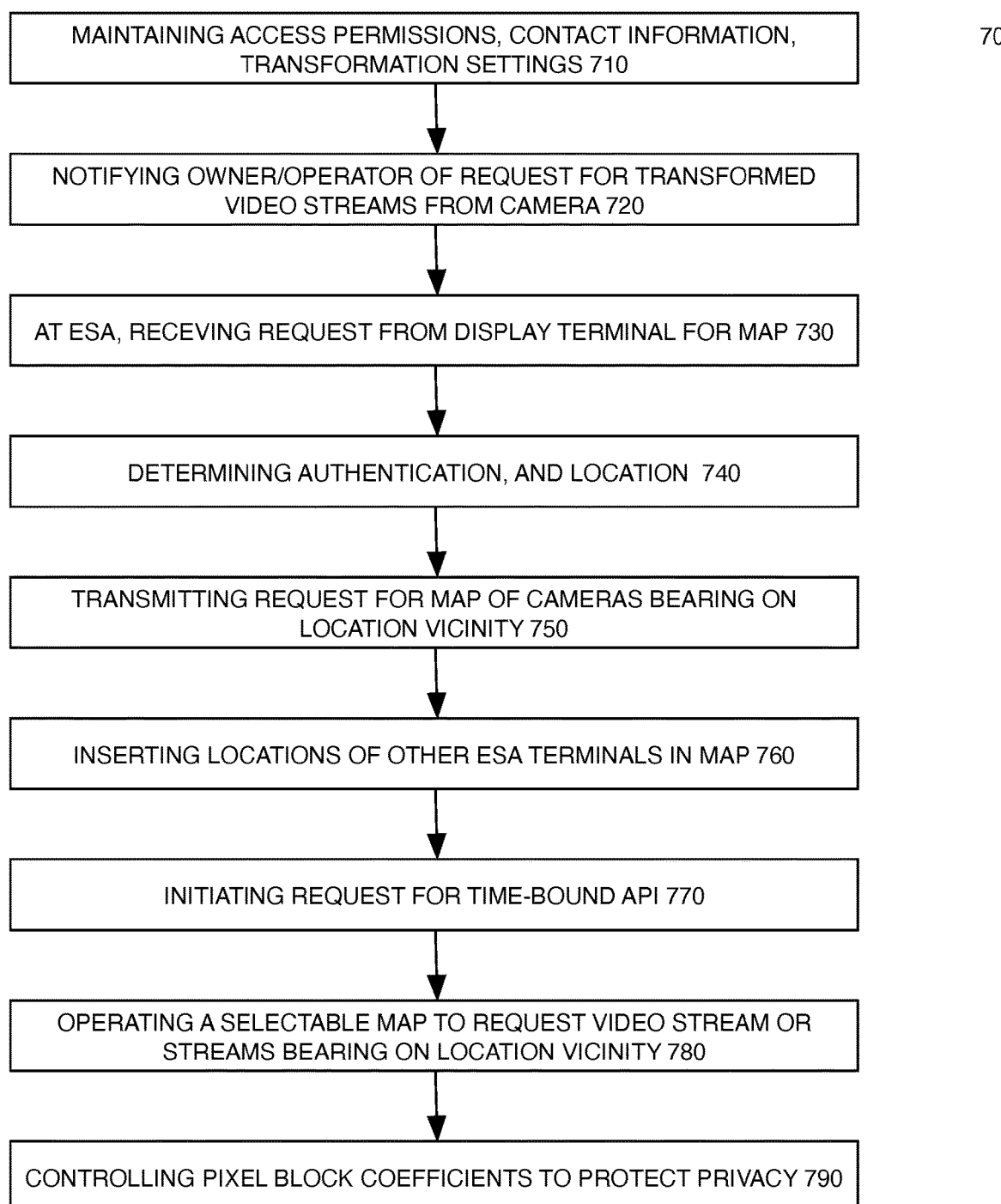

700

MAINTAINING ACCESS PERMISSIONS, CONTACT INFORMATION, TRANSFORMATION SETTINGS 710

NOTIFYING OWNER/OPERATOR OF REQUEST FOR TRANSFORMED VIDEO STREAMS FROM CAMERA 720

AT ESA, RECEIVING REQUEST FROM DISPLAY TERMINAL FOR MAP 730

DETERMINING AUTHENTICATION, AND LOCATION 740

TRANSMITTING REQUEST FOR MAP OF CAMERAS BEARING ON LOCATION VICINITY 750

INSERTING LOCATIONS OF OTHER ESA TERMINALS IN MAP 760

INITIATING REQUEST FOR TIME-BOUND API 770

OPERATING A SELECTABLE MAP TO REQUEST VIDEO STREAM OR STREAMS BEARING ON LOCATION VICINITY 780

CONTROLLING PIXEL BLOCK COEFFICIENTS TO PROTECT PRIVACY 790

FIG 7

REAL TIME CAMERA MAP FOR EMERGENCY VIDEO STREAM REQUISITION SERVICE

CROSS-REFERENCE TO RELATED APPLICATIONS

The present application is Continuation-In-Part of Ser. No. 17/563,044 which is incorporated by reference and which is a Continuation-In-Part of Ser. No. 16/863,677 and benefits from its priority date Apr. 30, 2020.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Technical Field

The disclosure relates to video security systems and shared access to video streams.

Background: As is known wireless security cameras are becoming widely accepted by businesses and home owners. Many doorbells are being replaced by video camera-based appliances which connect to mobile phones. Governments have invested in street-level and public transportation centers surveillance. And neighbors may desire to share views with each other.

As is known, both publicly operated and privately owned video cameras bear on many thoroughfares, yards, parks, and the exteriors of homes and businesses. Potential loss of control over these assets raises privacy issues and prevents issuing broad credentials such as passwords to traverse across unaffiliated video security networks.

What is needed is a system which enables a police or emergency services agency to obtain situation awareness while enroute to an incident or event even at the borders of their own jurisdictions. What is needed is a way for neighbors using disparate video camera networks to share views across their common streets and yards without losing control over privacy.

SUMMARY OF INVENTION

A method of operation provides at least one transformed video stream from, at least one privately owned and operated camera bearing on an in-scope location vicinity, to, at least one responding emergency service agency (ESA). A request from an emergency services agent's display terminal includes location indicia and elicits a map of cameras bearing on the location vicinity as well as other display terminals in the area. Upon request, a time-bound application programming interface enables a transformed video stream compliant to the privacy and access settings of the camera owner/operators. An emergency service agency may requisition or demand access to video streams from an other emergency service agency or public entity or private camera owner/operators during an event which may be heading toward their facilities or when searching for a suspect who may be hiding on their property.

A plurality of private security surveillance cameras are coupled to a server. According to privacy/publication settings, exterior/street view video images are streamed to the server. An emergency agency vehicle at a location has a display for a selected gallery of exterior/street views from cooperative networks of private security cameras which are presented and selectable from a map.

BRIEF DESCRIPTION OF THE DRAWINGS

FIG. 2 is a block diagram of a security surveillance system using location indicia of cameras and displays.

FIG. 3 is a method flow chart of processes at a security surveillance server coupled to a network operator and to a display.

FIG. 5, a flowchart of method processes at a server to provide a plurality of views on a location vicinity by streaming from an exemplary two camera networks.

FIG. 6 is a method flowchart for providing a selectable map of camera locations and responding to an access request.

FIG. 7 is a method flowchart for requesting access to from an owner operator and transforming video streams by pixel block coefficient masking for privacy.

DETAILED SPECIFICATION

Figure 1:
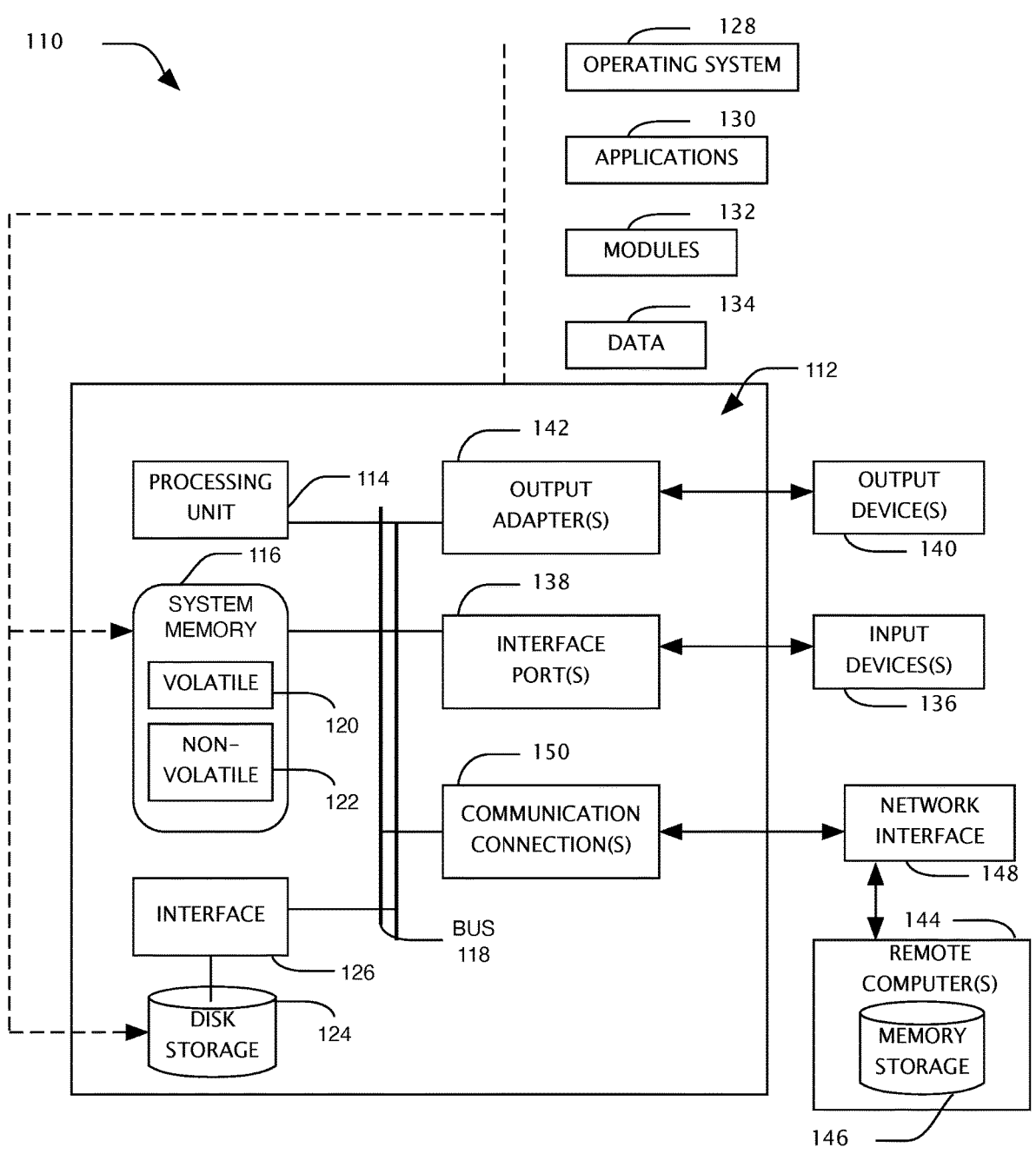
FIG. 1 is a block diagram of an exemplary processor.

In an embodiment, two emergency operations centers (EOC) of overlapping or contiguous jurisdictions may have independent camera networks. But under certain rapidly evolving emergent situations responders of each governmental agency may need awareness of a view from the opposite perspective, e.g. the side of the street in the other jurisdiction.

Just as neighbors in private life may have informal sharing of neighborhood watch, two independent jurisdictions may agree to provide views from across their respective boundaries without direct connection into their internal data systems or networks. Streets that represent borders may be viewed from both sides by defining a shared access region by each of the EOC's. Video image of exteriors of building on the boundary street and traffic on the street are streamed to a private security surveillance server. Emergency vehicles within the boundary region are identified by their location indicia and automatically are authenticated to access video streams on the boundary street from any perspective. Each agency's EOC is in control of enabling relay of its chosen cameras into the privately hosted security surveillance server during the time range of choice.

A private security surveillance server receives video images from a first government network controlled by a first EOC and from a second government network controlled by a second EOC. When cameras are within range of the border, it is mutually beneficial to view images from perspectives on both sides.

Each EOC can selectively release video streams from their side of the street to the server for access by mobile terminals authenticated by the other EOC and in the vicinity of the border by location indicia. The mobile terminal may sense the location and automatically initiate a request for border zone video streams. The private server receives credentials and location indicia from any emergency vehicle and enables streaming from both sides of the border if authorized.

And in an embodiment, various private streams are grouped according to cooperative nosey neighborhood mutual license agreements and narrow casted to the pool of operations managers for each participating security surveillance camera network, e.g. a residential building manager, a mall operator, a chain of coffee shops, or a home owner's association.

In an embodiment, a plurality of near simultaneous video images is transformed to an array of vehicle and personal avatars.

A Mobile Aggregate Display (MAD) user requests a congestion map of geography surrounding his authenticated emergency agency vehicle.

In an embodiment, colorized avatars are geo-located according to rules and camera locations, e.g. blue rhomboids, yellow caterpillars, green cylinders, red bundles of cylinders (fascia).

Each of n.times.m locations is populated with avatars in positions relative to the requesting emergency agency vehicle.

In an embodiment, for a selected location in the map, video streams are provided for situational awareness, e.g. north facing views above the map, south facing views below the map.

Peer emergency vehicles are displayed in relative positions on the array, e.g. little checkered car for other police vehicles within a 3 block radius of requestor.

Multiple views of a public thoroughfare and the edifices adjoining it may be obtained from opposite sides by cameras mounted in private property or property controlled by foreign countries, states, cities, counties, or various unlike entities.

Privacy, intellectual property, morality, and legal considerations may preclude control or commandeering of video streams from cameras best positioned to observe an entity's threats to safety and security.

Yet neighbors cannot be prevented from seeing out of their property and viewing the externality of adjoining public and private lands, buildings, and vehicles or individuals occupying their viewpoints. What is observable and thus recordable in media is their intellectual property.

Private individuals may certainly agree to exchange views of their neighboring doors and yards without requiring permits. If they choose, they may publish the video streams so long as they control who when and where the images may be received.

Emergency services of different geographical or legal authority may not have general authority to compel access to video from private cameras or from cameras owned by a non-cooperating agency. Nor would they want to authorize general access to their own video assets.

The present invention enables public and private video asset owners to control what they choose to share with neighbors, when, and with whom and under what circumstances by placing the streams into a secure videostore and setting dynamic constraints on access.

Private neighbors or relatives may choose to select who may receive video streams from their cameras and when.

They may also choose which agencies might have access and under which circumstances e.g. an emergency vehicle within B city blocks or K kilometers.

Enterprise facility managers may choose to enable/exchange views from their externally positioned cameras for adjacent properties. "I'll let you watch your back fence if you let me watch mine."

A subscriber to a video security surveillance service may preset or dynamically enable access to video streams to neighbors or to emergency service providers at various levels: e.g. selected video streams may be always accessible to emergency service provider at an operations center; User can choose to share specific cameras with first responders/EOC's as Always access (First responder/EOC always has access to that camera), or other video streams may be conditionally accessible to emergency service personnel when their location service is within the vicinity of the protected geography e.g. 500 feet, 3 kilometers, (Always access if within range (define GPS range)—First responder/EOC always has access to that camera IF within predefined GPS range). Other video streams may be restricted to time ranges or only upon demand/request to the asset owner or both. (On request-First responder/EOC can request access to the users cameras and need to wait until users has allowed access. User can allow access for X amount of time.)

A subscribing emergency services agency which participates in a mutual aid video security surveillance cooperative enables its emergency operations center to list the cameras from private video streams and publicly owned cameras from its neighboring jurisdictions and its own cameras, which potential list can be offered to an emergency services provider; e.g. (First responder/EOC: Request list of cameras that they have access to), An emergency services provider may request access to the subset of active cameras within a selected range of an emergent situation, (e.g. Request list of cameras that are within range (define GPS coordinates))

An emergency services provider or operations center may initiate a request to a neighbor agency or to a private entity to enable temporary access to specific cameras to a mobile terminal with location indicia: e.g. (Request access to specific camera; Access can be done with any type of device (phone, computer.))

Ubiquitous fixed and mobile cameras lead to concerns over privacy of imagery captured by publicly owned cameras and where they may be acquired and to whom disseminated. Similarly, privately owned cameras capture imagery that the owners have rights to control even if the source are on public property. The invention enables camera operators to refine their content provision and control where and when the content is displayed.

Content Provider Methods Enable Various Controls. Individual Private Camera Owners May Set Control for:

Transitory/background filtering Virtual depth of field, depth of focus Time of day, day of week, calendar Absolute/relative Location of viewer Neighborhood Cooperatives May Set Control to:

Among neighborhood members of cooperative To residents in location or remote Time of day, day of week, calendar or To local emergency service agency Corporate/Non-Governmental Security Administrators Determine:

Employee privacy and asset protection Internal/external observability and security Judicial requirement Community responsibility Emergency services Public Governmental Agencies have Powers for:

Public utility

Regulatory Enforcement

Emergency Services

Mutual aid

Mixed/Blended Aggregations have Flexibilities:

Constrained by original content provider To authenticated, localized displays Upon request or agreed policy Public zone depth of focus default setting Under judicial/legislative requirement Enabled to view subject matter from extra territorial perspective Referring now to the figures: FIG. 1 is a block diagram of an exemplary processor suitable for performance of instructions encoded on non-transitory media causing execution of a method embodiment of the invention. With reference to FIG. 1, an exemplary environment 110 for implementing various aspects of the invention includes a computer 112. The computer 112 includes a processing unit 114, a system memory 116, and a system bus 118. The system bus 118 couples system components including, but not limited to, the system memory 116 to the processing unit 114. The system bus 118 can beany of several types of bus structure(s). The system memory 116 includes volatile memory 120 and nonvolatile memory 122. Computer 112 also includes removable/nonremovable, volatile/nonvolatile computer storage media. FIG. 1 illustrates, for example a disk storage 124. It is to be appreciated that FIG. 1 describes software that acts as an intermediary between users and the basic computer resources described in suitable operating environment 110. Such software includes an operating system 128. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. A user enters commands or information into the computer 112 through input device(s) 136. These and other input devices connect to the processing unit 114 through the system bus 118 via interface port(s) 138. Computer 112 can operate in a networked environment using logical connections to one or more remote computers, such as remote computer(s) 144. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, and Bluetooth. Communication connection(s) 150 refers to the hardware/software employed to connect the network interface 148 to the bus 118.

As shown in FIG. 2, a security surveillance system 200 includes, its server 201, a first camera network operator 220, a first surveillance video consumer 240, and a display terminal 290 having location indicia 291. Said server having location/view orientation data store 203 for each video stream and terminal authentication indicia 292 and access policy 293. In simple cases, the identifier of the camera and its view of a location 260 is fixed and may be referred to descriptively e.g. the ferry dock.

FIG. 3 illustrates processes at a server including receiving from a network operator 325 settings for access policy and terminal authentication for at least one selected camera each having view of at least one location;

Receiving from a display terminal 335 location indicia and a request for access to video stream from selected camera having view of said one location;

The server responding to a request from the display terminal, by authenticating the terminal, its location, against the network operator's setting for access policy 345;

Determining which video stream corresponds to the requested location 355;

In an embodiment, initiating a customized time-bound API in a virtual machine 365; and Fulfilling operations under control of the API 395.

Figure 4:
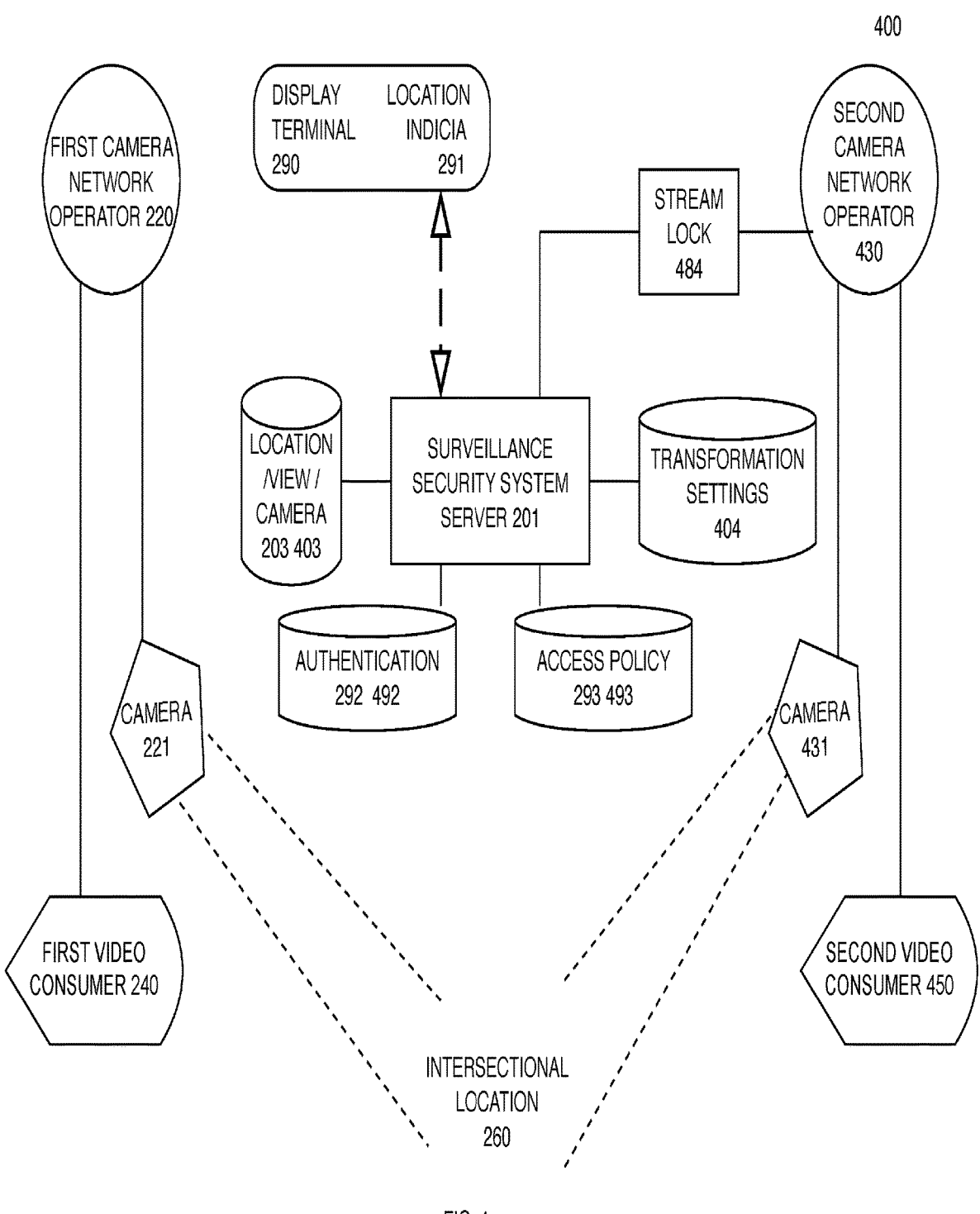
FIG. 4 is a block diagram of the system in an embodiment with two exemplary non-limiting camera networks coupled to the server.

In an embodiment, the system 400 illustrated in FIG. 4 further includes a stream lock 484: coupling the surveillance security system server to a second camera network operator 430, transformation settings store 404 also coupled to the server, the second camera network operator 430, coupled to at least one camera 431, and coupled to a second video consumer 450. Additional settings are inserted into the location/view per camera store 403, authentication store 492, and the access policy store 493 including authentication and location settings for mobile emergency service display terminals.

In various embodiments, first and second network operators are public service agencies; first and second network operators are private security services; or first network operator is public and second network operator is private. In this illustration, intersectional location 260 may be in view of cameras located in different jurisdictions/states/properties. A request from a display terminal may cause a stream lock to open for a time range, or for selected display terminals identified by location indicia or authentication credential. Optional transformations set by the various network operators may obfuscate near or distant detail of shared video streams possibly employing 3D distance sensing and pixel block coefficient masking beyond what is accessible to the video consumers of each network.

The method is further illustrated in FIG. 5, including an embodiment of receiving from a second network operator 510, video stream transformation settings and additional location/view per camera indicia, authentication, and access policy for display terminals;

Receiving from a display terminal 520 authentication and location indicia and a request to access video streams from another emergency services agency;

Receiving from a display terminal 530 a location vicinity of interest;

Determining a plurality of cameras 540 which bear on the location vicinity:

Enabling a stream lock 550 to pass through video streams from a second camera network;

Transforming a video stream 560 according to transformation settings and access policy per display terminal and transmitting said transformed video stream through a time-bound api;

Wherein transforming a video stream comprises at least one of obfuscating details of background images 570;

Wherein transforming a video stream comprises determining a range of distance from a camera to objects in view 580; and Masking high resolution bits from pixel block coefficients 590 for at least one of objects within curtilage of a camera owner property, objects beyond the pubic thoroughfare or property, and obfuscating objects outside of the public thoroughfare either nearer than and farther than.

FIG. 6 is a non-limiting exemplary method of operation 600 to provide at least one transformed video stream from, at least one privately owned and operated camera bearing on an in-scope location vicinity, to, at least one responding emergency service agency (ESA), the method including the processes:

At a responding ESA, determining an identifier 610 for a time and location vicinity for an emergency incident, assigning a display terminal 620 to at least one responding agent, transmitting a requisition 630 for transformed video streams in-scope to said location vicinity to a surveillance security server (video server); and upon receiving a time-bound application programming interface 640, relaying 650 among the video server and at least one assigned display terminal.

In an embodiment, the method of operation also includes the processes:

At said video server, maintaining a geo-location macro map 660 of cameras bearing on a plurality of location vicinities (such as but not limited to street addresses, landmarks, campuses, intersections of streets, highway intersections and mile markers, bridges, commercial buildings, parks);

Upon receiving a request from an authenticated ESA display terminal 671, transmitting a zoomable and selectable in-scope map 675 of cameras bearing on a location vicinity pertinent to said request;

Upon receiving a request from an authenticated ESA display terminal 681, activating a time-bound application programming interface (API) and transmitting a link to access said API 685; and Fulfilling said API operations 690 by transforming and transmitting video streams bearing on a location vicinity.

FIG. 7 illustrates an embodiment of the method of operation further including the processes 700:

Maintaining a database 710 of camera owner/operator access permissions, contact information, and default transformation settings;

Notifying each owner/operator 720 of cameras in-scope of a request that an emergent incident may select transformed video streams from certain cameras; wherein Transformation settings includes synthetic depth of focus/depth of field to enable selective blurring outside of the public thoroughfare and public lands, blurring within the curtilage of private properties, and hiding background and other intransigent detail (buildings, yards, fences, signage);

Access permissions includes enabling access to display terminals associated with neighbors, security service providers, owner's relations, ESA, location indicia ranges, time of day, day of week, time-bounds (minutes, hours, days), classes of ESA, named services, and whether video streams from cameras bearing solely on interior locations are transmitted.

And in an embodiment, at an ESA, receiving a request 730 from an emergency services agent's display terminal to request a map of localized cameras in its vicinity; determining authentication and location indicia of the display terminal 740; transmitting a request to a server 750 for a zoomable and selectable map of cameras bearing on the location vicinity of the requesting display terminal; inserting locations 760 of other ESA display terminals in the map; and initiating a request 770 for a time-bound API, wherein an in-scope location vicinity is a measure of distance such as city blocks, meters, or kilometers surrounding the location indicia of the requesting display terminal.

Wherein, operating a selectable map initiates 780 a request for a single video stream from an isolated camera or a request for a plurality of video streams from all cameras bearing on a location vicinity;

Wherein synthetic depth of focus/depth of field is provided by a method of controlling pixel block coefficient masking 790 to protect privacy of faces and objects close to the property of the camera owner/operator or to protect privacy of faces and objects of neighbors beyond the public thoroughfare and lands; Wherein access permissions and transformation settings may be overridden by judicial and legislative orders of the location vicinity.

Figure 8:
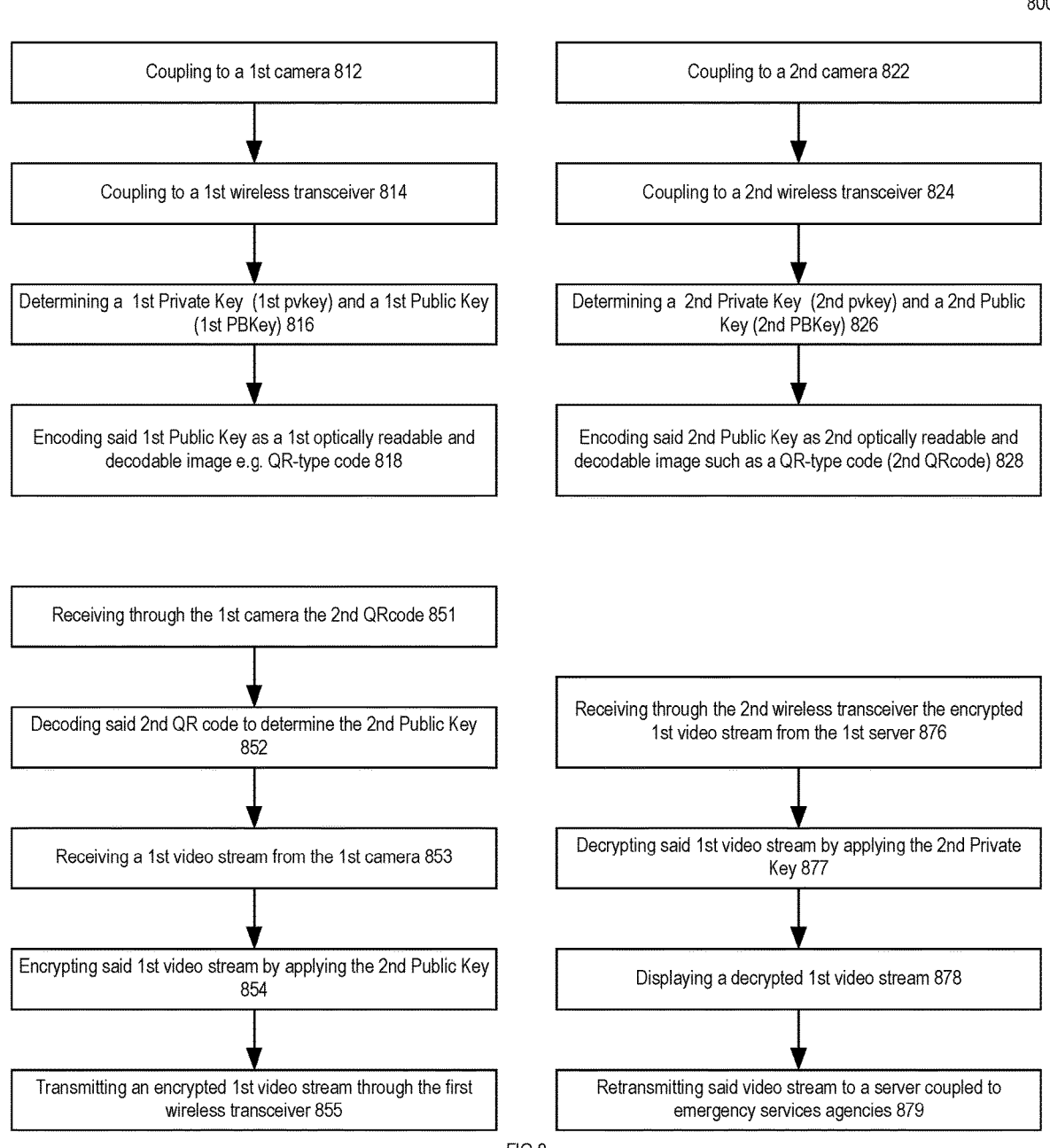
FIG. 8 is a flowchart of a distributed method performed by processors of a first server and a second server, each coupled to the Internet, a camera, a wireless transceiver, and to a display.

Referring now to FIG. 8: one embodiment of the invention is illustrated in FIG. 8 as a method for peer to peer real time video streaming among private security surveillance servers. Method steps 800 are distributed among processors performing executable instructions in a plurality of servers. At a plurality of Internet coupled servers each further coupled to a display, further coupled to a camera and further coupled to a wireless network through a transceiver, exchanging public keys (PBkeys), requests for video streams, and encrypted video streams as follows:

At a first server, the processes include Coupling to a first camera 812, coupling to a first wireless transceiver 814, determining a 1.sup.st Private Key (pvkey) and a 1.sup.st Public Key (1.sup.st PBKey) 816, and encoding said 1.sup.st Public Key as a 1.sup.st optically readable and decodable image such as a QR-type code 818. At a second server, the processes include Coupling to a second camera 822, coupling to a second wireless transceiver 824, determining a 2.sup.nd Private Key (2.sup.nd pvkey) and a 2.sup.nd Public Key (2nd PBKey) 826, and encoding said 2.sup.nd Public Key as 2nd optically readable and decodable image such as a QR-type code (2.sup.nd QRcode) 828. The method 800 also includes: At the first server, Receiving through the first camera the 2.sup.nd QRcode 851; Decoding said 2.sup.nd QR code to determine the 2.sup.nd Public Key 852; Receiving a first video stream from the first camera 853; Encrypting said 1.sup.st video stream by applying the 2.sup.nd Public Key 854; and Transmitting an encrypted 1.sup.st video stream through the first wireless transceiver 855. While both servers may perform the same tasks, for ease of comprehension a simpler asymmetrical case is illustrated. At the second server, Receiving through the second wireless transceiver the encrypted 1.sup.st video stream from the first server 876; Decrypting said 1.sup.st video stream by applying the 2.sup.nd Private Key 877; Displaying a decrypted first video stream 878; and, optionally, Retransmitting said video stream to a server coupled to emergency services agencies 879.

EMBODIMENTS OF THE INVENTION

Another aspect of the invention is a method for operation of a video security surveillance server which includes Receiving and storing a map of camera locations; Receiving and storing a credential for at least one emergency services agency terminal; Instantiating into at least one virtual machine a video server application coupling an authenticated esa terminal to said map; and Synthesizing a time-bound api for real-time data communication with esa terminals. The method also includes: Receiving at least one video stream from a video security surveillance camera; Connecting to esa terminals through said time-bound API; Receiving a range of valid locations for emergency service agency terminals The method also includes exchanging and authenticating credentials with privately owned security surveillance servers; receiving and storing a location map of cameras controlled by privately owned security surveillance servers; and receiving criteria for permitted content consumption of video streams from privately owned security surveillance servers. Another aspect of the inventions is a method of operation for a video surveillance security server: receiving from a first emergency service agency (ESA) display terminal an authentication credential for said agency, location indicia for the current vicinity of said terminal, and a request for enabled video streams within a specified range of said location indicia; enabling transmission through at least one time-bound application programming interface (api); transmitting a map of camera locations within a specified range of said location indicia; and fulfilling the api by transmitting a video stream from at least one privately owned and operated video surveillance camera to said requesting ESA display terminal. In an embodiment, said ESA display terminals are mobile, and the method also includes modifying the first at least one video stream transmitted through said api by adding a second video stream from a publicly owned and operated video surveillance camera; removing a video stream as location indicia of the said display terminal changes; transmitting a plurality of video streams to present views of any selected location within a specified range of said location indicia from different perspectives; and transmitting a map of other ESA display terminals in the vicinity of said first ESA display terminal or of a selected location vicinity. In an embodiment, the method also includes receiving from an individually owned private surveillance security video camera (video camera) a video stream; determining location indicia of said video camera; receiving and storing owner selected optional criteria for content consumption; transforming said video stream according to owner selected optional settings; and enabling access to the video stream through a time-bound application programming interface. In an embodiment, transforming includes optional pixel block coefficient editing for blurring of at least one object in curtilage and one object beyond a public way by control of virtual depth of focus/depth of field. In an embodiment, a time-bound api performs the steps storing a virtual machine image of said api into a processor core at a first time and purging said virtual machine image at a second time. In an embodiment, content consumption criteria is at least one of emergency services agency, trusted neighbor, community management, facility manager, self, location of mobile display within a vicinity, and owner of cameras in view of individually owned private surveillance camera or adjoining properties. In an embodiment, a plurality of video streams includes opposing views of a public location. In an embodiment, transforming includes optional pixel block coefficient editing for blurring of at least one object in curtilage and one object beyond a public way by control of virtual depth of focus/depth of field. In an embodiment, a time-bound api performs the steps storing a virtual machine image of said api into a processor core at a first time and purging said virtual machine image at a second time. In an embodiment, content consumption criteria is at least one of emergency services agency, trusted neighbor, community management, facility manager, self, location of mobile display within a vicinity, and owner of cameras in view of individually owned private surveillance camera or adjoining properties. In an embodiment, a plurality of video streams includes opposing views of a public location. In an embodiment, transforming said video stream includes optionally masking out unchanging background and foreground pixel blocks relative to at least one of time of day, day of week, and previous hour.

An exemplary embodiment of the invention is a method of operation to provide at least one transformed video stream from, at least one publicly or privately owned and operated camera bearing on an in-scope location vicinity, to, at least one responding emergency service agency (ESA), the method includes: at a responding ESA, determining an identifier for a time and location vicinity for an emergency incident, assigning a display terminal to at least one responding agent, transmitting a requisition for transformed video streams in-scope to said location vicinity to a surveillance security server (video server); and upon receipt of a time-bound application programming interface, relaying among the video server and at least one assigned display terminal. In an embodiment, the method of operation further includes: at said video server, maintaining a geo-location macro map of cameras bearing on a plurality of location vicinities (street addresses, landmarks, campuses, intersections of streets, highway intersections and mile markers, bridges, commercial buildings, parks, etc); upon request from an authenticated ESA display terminal, transmitting a zoomable and selectable in-scope map of cameras bearing on a location vicinity pertinent to said request; upon request from an authenticated ESA display terminal, activating a time-bound application programming interface (API); transmitting a link for operation of said API to said display terminal; and fulfilling said API operations by optionally transforming and transmitting video streams bearing on a location vicinity.

In an embodiment, the method of operation further includes: maintaining camera owner/operator access permissions, contact information, and default transformation settings; notifying each owner/operator of cameras in-scope of a request or demand for transformed video streams from certain cameras; and, requesting additional access to cameras when an emergency is coming toward the owner/operator's facility or when a suspect may be hiding on their property; wherein transformation settings include optional synthetic depth of focus/depth of field to enable selective blurring outside of the public thoroughfare and public lands, blurring within the curtilage of private properties, and hiding background and other intransigent detail (buildings, yards, fences, signage); and wherein, access permissions include display terminals associated with neighbors, security service providers, owner's relations, ESA, location indicia ranges, time of day, day of week, time-bounds (minutes, hours, days), classes of ESA, named services, and whether video streams from cameras bearing solely on interior locations are transmitted. In an embodiment, the method further includes: at an ESA, receiving a request from an emergency services agent's display terminal to request a map of localized cameras in its vicinity; determining authentication and location indicia of the display terminal; transmitting a request or demand to a server for a zoomable and selectable map of cameras bearing on the location vicinity of the requesting display terminal; inserting locations of other ESA display terminals in the map; and initiating a request for a time-bound api, wherein an in-scope location vicinity is blocks, meters, or kilometers surrounding the location indicia of the requesting display terminal or of a reported incident, wherein, a selectable map initiates a request or demand for a single video stream from an isolated camera or a request or demand for a plurality of video streams from all cameras bearing on a location vicinity; wherein synthetic depth of focus/depth of field controls optional pixel block coefficient masking to protect privacy of faces and objects close to the property of the camera owner/operator or to protect privacy of faces and objects of neighbors beyond the public thoroughfare and lands; and wherein access permissions and transformation settings may be overridden by legally approved orders of the location vicinity.

Another embodiment of the invention is hybrid video network of at least one video security surveillance camera service; at least one emergency services agency having mobile aggregate display terminal (MAD terminal); and a geo-location service associated with said MAD terminal.

Another embodiment of the invention is a method of operation for a hybrid network includes: upon determination that an emergent situation may relocate into the vicinity of a served area of a video security surveillance camera system; requesting access by mobile aggregate display (MAD) terminals for a range of time to a range of cameras of an independent video security surveillance camera (VSSC) service; transmitting authentication codes for at least one mobile aggregate display (MAD) terminal in or approaching said vicinity; transmitting location indicia of the said MAD terminal; upon enablement by the administrator of the independent VSSC service, receiving a real time map/grid of at least one avatar within the locations of cameras in the independent VSSC service; and upon selection of a location in the map/grid, receiving a gallery of video images streaming from cameras directed toward the selected location during said range of time, wherein an avatar is a representation of at least one of a vehicle, an individual, and a group of persons.

Another embodiment of the invention is a method of operation for a video surveillance security server, the method including processes: receiving from a first emergency service agency (ESA) display terminal an authentication credential for said agency, location indicia for the current vicinity of said terminal, and a request for enabled video streams within a specified range of said location indicia; enabling transmission through at least one time-bound application programming interface (API); transmitting a map of camera locations within a specified range of said location indicia; and fulfilling the API by transmitting a video stream from at least one privately owned and operated video surveillance camera to said requesting ESA display terminal.

In an embodiment, the method wherein said ESA display terminals are mobile, and modifying the first at least one video stream transmitted through said API by adding a second video stream from a publicly owned and operated video surveillance camera; removing a video stream as location indicia of the said display terminal changes; transmitting a plurality of video streams to present views of any selected location within a specified range of said location indicia from different perspectives; and transmitting a map of other ESA display terminals in the vicinity of said first ESA display terminal or of a selected location vicinity.

In an embodiment, the method further includes: receiving from an individually owned private surveillance security video camera (video camera) a video stream; determining location indicia of said video camera; receiving and storing owner selected optional criteria for content consumption; transforming said video stream according to owner selected optional settings; and enabling access to the video stream through a time-bound application programming interface.

In an embodiment, the method disclosed above wherein: transforming comprises optional pixel block coefficient editing for blurring of at least one object in curtilage and one object beyond a public way by control of virtual depth of focus/depth of field; a time-bound API comprises storing a virtual machine image of said API into a processor core at a first time and purging said virtual machine image at a second time; content consumption criteria is one of emergency services agency, trusted neighbor, community management, facility manager, self, location of mobile display within a vicinity, and owner of cameras in view of individually owned private surveillance camera or adjoining properties; a plurality of video streams are opposing views of a public location; and transforming said video stream includes optional masking out unchanging background and foreground pixel blocks relative to at least one of time of day, day of week, and previous hour.

Another embodiment of the invention is a system for rapid situational awareness through security video streaming, which includes: a mobile app on a wireless display terminal, communicatively coupled to a security surveillance system server, coupled to a plurality of video image cameras each having a range of view denoted by location indicia; a map/grid of camera identities pertinent to each location; a circuit to authenticate location and identity of a wireless display terminal upon receiving its request; a circuit to format a layout of the map/grid of cameras within a selectable range of the location of the requesting wireless display terminal; a circuit to populate the layout with avatars for the individuals, groups of persons, and vehicles in view of cameras by location indicia; and, a circuit to encode and stream video images from selected locations to said wireless display terminal. As is known, processors configured by executable instructions encoded on non-transitory media perform the functions of circuits.

Another aspect of the invention is a system comprising at least one wireless display terminal, communicatively coupled to, a security surveillance system server, wherein said wireless display terminal (terminal) comprises means for determination and transmission of its location indicia, and identity indicia to said server within a request for situational awareness through video streaming. In an embodiment, the system also includes: a store within said server of identity credentials of said terminal(s) and a map/grid of the locations of said terminals; a circuit within said server to authenticate a request from a terminal for situational awareness through video streaming; and a circuit to place into said map/grid an avatar representation of each authenticated terminal having made a request for situational awareness. In an embodiment, the system also includes: a plurality of video image cameras coupled to said server, each camera having an range of view denoted by location indicia; and within said server, a circuit to place into said map/grid an area representation of the range of view provided from each camera. In an embodiment, the system also includes: a mobile app installed on said terminal to perform display of the map/grid, to request a video stream from at least one camera, and to display said video stream. In an embodiment, the system also includes: a circuit at the server to assign at least one camera to at least one display terminal and to enable a video stream captured at said camera to display at said terminal.

Another aspect of the invention is a system comprising: a plurality of cameras; coupled to a plurality of display terminals; and a circuit to assign a digital signature to each moving block of pixels associated with at least one of a vehicle and a group of persons. In an embodiment, the system also includes: a circuit to determine when said digital signature transits from a first video stream to a second video stream. In an embodiment, the system also includes: a circuit to assign an avatar to a digital signature assigned to a moving block of pixels and position the avatar in a map/grid of locations of terminals and cameras. In an embodiment, the system also includes: a mobile app on said display terminal which receives a map/grid of other display terminals, camera locations, and selectable avatars of vehicles and groups persons. In an embodiment, said mobile app receives and displays a video stream from a camera on the condition that a selected avatar enters the range of view of the camera.

Another aspect of the invention is a system for rapid situational awareness through security video streaming, comprising: a mobile app on a wireless display terminal; communicatively coupled to, a security surveillance system server; coupled to, a plurality of video image cameras, each having a range of view denoted by location indicia; a map/grid of camera identities pertinent to each location; a circuit to authenticate location and identity of a wireless display terminal upon receiving its request; a circuit to format a layout of the map/grid of cameras within a selectable range of the location of the requesting wireless display terminal; a circuit to populate the layout with avatars for the individuals, groups of persons, and vehicles in view of cameras by location indicia; and, a circuit to encode and stream video images from selected locations to said wireless display terminal.

Another aspect of the invention is a method for operation of a video security surveillance server comprising: receiving and storing a map of camera locations; receiving and storing a credential for at least one emergency services agency (esa) terminal; instantiating into at least one virtual machine a video server application coupling an authenticated esa terminal to said map of camera locations; and synthesizing an application programming interface (API) exclusively operable between an initiation time and a termination time for real-time data communication with esa terminals. In an embodiment, the method also includes: receiving at least one video stream from a video security surveillance camera; connecting to esa terminals through said API exclusively operable between an initiation time and a termination time set by the owner; and receiving a range of valid geolocations for emergency service agency terminals. In an embodiment, the method also includes: exchanging and authenticating credentials with privately owned security surveillance servers; receiving and storing a location map of cameras controlled by privately owned security surveillance servers; receiving criteria for permitted content distribution of video streams from privately owned security surveillance servers; and, transmitting a video stream from a privately owned security surveillance server to an emergency service agency terminal.

Another aspect of the invention is a method of operation for a private video surveillance security server: receiving from a first emergency service agency (ESA) display terminal an authentication credential for said agency, location indicia for the current vicinity of said terminal, and a request for enabled video streams within a specified range surrounding said location indicia; enabling transmission of a video stream through at least one application programming interface (api) exclusively operable between an initiation time and a termination time set by its owner; transmitting a map of camera locations within a specified range of said location indicia; and fulfilling the api by transmitting a video stream from at least one privately owned and operated video surveillance camera to said requesting ESA display terminal.

In an embodiment, ESA display terminals are mobile, and further comprising:modifying the first at least one video stream transmitted through said api by adding a second video stream from a publicly owned and operated video surveillance camera; removing a video stream as location indicia of the said display terminal changes; transmitting a plurality of video streams to present views of any selected location within a specified range surrounding said location indicia from different perspectives; and transmitting a map of other ESA display terminals in the vicinity of said first ESA display terminal or of a selected location vicinity. In an embodiment, receiving from a privately owned and operated surveillance security video camera (video camera) a video stream; determining location indicia of said video camera; receiving and storing owner selected criteria for content distribution; transforming said video stream according to owner selected settings; and enabling access to the video stream through an application programming interface (api) exclusively operable between an initiation time and a termination time set by the owner.

In an embodiment, transforming comprises pixel block coefficient editing for blurring of at least one object in curtil age and blurring of at least one object beyond a public way by control of virtual depth of focus/depth of field. In an embodiment, an api exclusively operable between an initiation time and a termination time set by the owner comprises storing a virtual machine image of said api into a processor core at said initiation time and purging said virtual machine image at said termination time. In an embodiment, content distribution criteria comprises at least one of emergency services agency, trusted neighbor, community management, facility manager, self, location of mobile display within a vicinity, and owner of cameras in view of individually owned private surveillance camera or adjoining properties based on the location indicia of each video camera. In an embodiment, a plurality of video streams includes at least a first view of a public location and a second view of said public location from an angle in a range of 150 to 210 degrees rotated from said first view. In an embodiment, transforming said video stream comprises masking out unchanging pixel blocks set for time of day, day of week, and previous hour.

CONCLUSION

The present invention is a long sought solution to an emerging complex problem. Multiple views of a public thoroughfare and the edifices adjoining it may be obtained from opposite sides by cameras mounted in private property or property controlled by foreign countries, states, cities, counties, or various unlike entities. Privacy, intellectual property, morality, and legal considerations may preclude control or commandeering of video streams from cameras best positioned to observe an entity's threats to safety and security. Yet neighbors cannot be prevented from seeing out of their property and viewing the externality of adjoining public and private lands, buildings, and vehicles or individuals occupying their viewpoints. What is observable and thus recordable in media is their intellectual property.

Private individuals may certainly agree to exchange views of their neighboring doors and yards without requiring permits. If they choose, they may publish the video streams so long as they control who when and where the images may be received. Emergency services of different geographical or legal authority may not have general authority to compel access to video from private cameras or from cameras owned by a non-cooperating agency. Nor would they want to authorize general access to their own video assets. The present invention enables public and private video asset owners to control what they choose to share with neighbors, when, and with whom and under what circumstances by placing the streams into a secure video store and setting dynamic constraints on access. Private neighbors or relatives may choose to select who may receive video streams from their cameras and when. They may also choose which agencies might have access and under which circumstances e.g. an emergency vehicle within B city blocks or K kilometers. Enterprise facility managers may choose to enable/exchange views from their externally positioned cameras for adjacent properties. "I'll let you watch your back fence if you let me watch mine."

The present invention is clearly distinguishable from conventional video surveillance systems. This include such limitations on operation for service server including:

Receiving commands from individual content provider Time day date access enablement per view Depth of focus/field for neighbor, public way, curtilage Compression/movement suppression of background scene details Neighbor id, owner access, community access, agency access Receiving commands from member of community Trusted neighbor permissions Shared space access to other members Other Settings Enable:

Movement sensitivity, auto scope Enable private security service access

Receiving requests from emergency service agent Request shared views from locations near me Request shared views from specific responsibility vicinities Request movement/change views Request depth of focus/field for public, curtilage, neighbor Receiving settings from camera network operator Time bound API to video streams Shared intersectional views from cooperative network operators Display Location indicia restrictions and, Available location video streams indicia.

An Exemplary Suitable Operating Environment: Computing Device

In order to provide additional context for various aspects of the subject invention, FIG. 1 and the following discussion are intended to provide a brief, general description of a suitable operating environment 110 in which various aspects of the subject invention may be implemented. While the invention is described in the general context of computer-executable instructions, such as program modules, executed by one or more computers, processors, or other devices, those skilled in the art will recognize that the invention can also be implemented in combination with other circuits, program modules, and/or as a combination of hardware and software.

Generally, however, program modules include routines, programs, objects, components, data structures, etc. that perform particular tasks or implement particular data types. The operating environment 110 is only one example of a suitable operating environment and is not intended to suggest any limitation as to the scope of use or functionality of the invention. Other well known computer systems, environments, and/or configurations that may be suitable for use with the invention include but are not limited to, mobile phones, tablets, cloud servers, gaming devices, displays, identity credentials and their readers, cameras, attire, vehicles, medical devices, watches, robots, security instruments, weapons systems, entertainment devices, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 1, an exemplary environment 110 for implementing various aspects of the invention includes a computer 112. The computer 112 includes a processing unit 114, a system memory 116, and a system bus 118. The system bus 118 couples system components including, but not limited to, the system memory 116 to the processing unit 114. The processing unit 114 can be any of various available processors. Dual microprocessors and multi-core architectures also can be employed as the processing unit 114. Within this application the term "processor" also refers to implementations of 112 in highly integrated embodiments.

The system bus 118 can be any of several types of bus structure(s) including the memory bus or memory controller, a peripheral bus or external bus, and/or a local bus using any variety of available bus architectures including, but not limited to, 11-bit bus, Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 116 includes volatile memory 120 and nonvolatile memory 122. The basic input/output system (BIOS), containing the basic routines to transfer information between elements within the computer 112, such as during start-up, is stored in nonvolatile memory 122. By way of illustration, and not limitation, nonvolatile memory 122 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DOR SDRAM), enhanced SDRAM (ESDRAM), Synchlink DRAM (SLDRAM), and direct Rambus RAM (DRRAM).

Computer 112 also includes removable/nonremovable, volatile/nonvolatile computer storage media. FIG. 1 illustrates, for example a disk storage 124. Disk storage 124 includes, but is not limited to, devices like a magnetic disk drive, floppy disk drive, solid state drive, flash memory card, or memory stick. In addition, disk storage 124 can include storage media separately or in combination with other storage media including, but not limited to, network storage, array of disks, or quantum storage. To facilitate connection of the disk storage devices 124 to the system bus 118, a removable or non-removable interface is typically used such as interface 126.

It is to be appreciated that FIG. 1 describes software that acts as an intermediary between users and the basic computer resources described in suitable operating environment 110. Such software includes an operating system 128. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. It is to be appreciated that the subject invention can be implemented with various operating systems or combinations of operating systems, virtual machines, and virtual machine images.

A user enters commands or information into the computer 112 through input device(s) 136. Input devices 136 include, but are not limited to, a radio, magnetic, or optical scanner, a pointing device such as, mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, HDMI, a serial port, a parallel port, a game port, and a universal serial bus (USB). Output device(s) 140 use some of the same type of ports as input device(s) 136. Thus, for example, a USB port may be used to provide input to computer 112, and to output information from computer 112 to an output device 140. Output adapter 142 is provided to illustrate that there are some output devices 140 like High Definition Televisions (HDTV), monitors, speakers, and printers among other output devices 140 that require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computer 112 can operate in a networked environment using logical connections to one or more remote computers, such as remote computer(s) 144. The remote computer(s) 144 can be a cloud service, personal computer, a server, a router, a network PC, a workstation, a microprocessor based appliance, a peer device or other common network node and the like, and typically includes many or all of the elements described relative to computer 112. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, Bluetooth, Near Field Communications, local-area networks (LAN) and wide-area networks (WAN). LAN technologies include Fiber Distributed Data Interface (FDDI), Copper Distributed Data Interface (CODI), Ethernet/IEEE 1102.3, Token Ring/IEEE 1102.5 and the like. WAN technologies include, but are not limited to, mesh, IP, point-to-point links, circuit switching networks like Integrated Services Digital Networks (ISDN), and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computer 112, it can also be external to computer 112. The hardware/software necessary for connection to the network interface 148 includes, for exemplary purposes only, internal and external technologies such as, modems including satellite, 802.11, CDMA, regular telephone grade modems, cable modems and DSL modems, ISDN adapters, and Ethernet cards.

Spirit and Scope of the Appended Claims

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible.

Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that various modifications may be made without departing from the spirit and scope of the invention. For example, other Application Programming Interface or video streaming implementations may be used. Accordingly, other embodiments are within the scope of the following claims.

The invention claimed is:

1. A method for enabling access to video streams based on a location within a range of a border, the method comprising:

storing, in a memory associated with a first server, a database of a plurality of cameras, the plurality of cameras including a set of public cameras and a set of private cameras, the plurality of cameras corresponding to a plurality of locations, each camera of the plurality of cameras bearing on a corresponding location of the plurality of locations, each camera being positioned on either a first side of the border or a second side of the border;

storing, in the memory associated with the first server, a set of privacy settings and a set of access permissions for each private camera of the set of private cameras, wherein a first access permission makes the private camera accessible to a mobile terminal that has been authenticated and a second access permission makes the private camera accessible when the mobile terminal is within a vicinity of the border;

receiving, from the plurality of cameras, a plurality of video streams;

receiving, from a mobile display terminal via a second server, a request for video streams, the request including a location indicia corresponding to the mobile display terminal;

in response to receiving the request, the first server performing:

selecting a set of cameras within a vicinity of the location indicia, wherein the set of cameras includes one or more of a private camera and a public camera;

determining, for a private camera of the set of cameras within the vicinity of the location indicia, the private camera is authenticated;

initiating an application programming interface (API) based on the request, wherein the API is accessible for an amount of time; and transmitting a link for the API to the mobile display terminal, wherein the mobile display terminal associated with the second server is configured to display, using the API, a set of video streams associated with the location indicia in the request based on the set of access permissions.

2. The method of claim 1, wherein the plurality of cameras comprises a first plurality of cameras associated with a first network and a second plurality of cameras associated with a second network.

3. The method of claim 1, wherein the private camera is conditionally accessible when the mobile display terminal is within a predefined GPS range of the border.

4. The method of claim 3, further comprising masking a portion of the video stream.

5. The method of claim 1, wherein the mobile display terminal comprises a mobile aggregate display (MAD).

6. A system for enabling access to video streams based on a location within a range of a border, the system comprising:

a first server comprising:

a memory storing:

a database containing information for a plurality of cameras including a set of public cameras and a set of private cameras, the plurality of cameras corresponding to a plurality of locations, each camera of the plurality of cameras bearing on a corresponding location of the plurality of locations, each camera being positioned on either a first side of the border or a second side of the border, wherein the database further contains, for each private camera of the set of private cameras, a set of access permissions for the private camera, wherein a first access permission makes the private camera always accessible to a mobile terminal that has been authenticated and a second access permission makes the private camera accessible when the mobile terminal is within a vicinity of the border; and a processor executing a set of instructions to:

receive, from the plurality of cameras, a plurality of video streams;

receive, from a mobile display terminal via a second server, a request for video streams, wherein the request further includes a location indicia corresponding to the mobile display terminal;

in response to receiving the request, the first server executing a set of instructions to:

select a set of cameras within a vicinity of the location indicia of the location indicia, wherein the set of cameras includes one or more of a private camera and a public camera;

determine, for each private camera of the set of cameras within the vicinity of the location indicia, the private camera is authenticated;

initiate a time-based application programming interface (API) based on the request; and transmit a link for the API to the mobile display terminal via the second server; and a display terminal associated with the second server, wherein the mobile display terminal associated with the second server is configured to display, using the API, a set of video streams based on the set of access permissions.

7. The system of claim 6, wherein the plurality of cameras comprises a first plurality of cameras associated with a first network and a second plurality of cameras associated with a second network.

8. The system of claim 6, wherein the first server executes a set of instructions to allow access to the video stream when the mobile display terminal is within a predefined global positioning system (GPS) range of the border.

9. The system of claim 8, wherein, the first server executes a set of instructions to mask a portion of the video stream.

10. The system of claim 6, wherein the mobile display terminal comprises a mobile aggregate display (MAD).

\* \* \* \* \*